Sept. 2, 1941. E. F. RIESING 2,254,783
INSULATOR
Filed Sept. 22, 1939 3 Sheets-Sheet 1
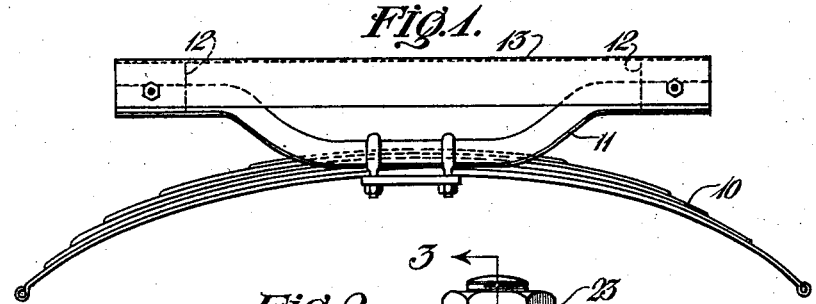
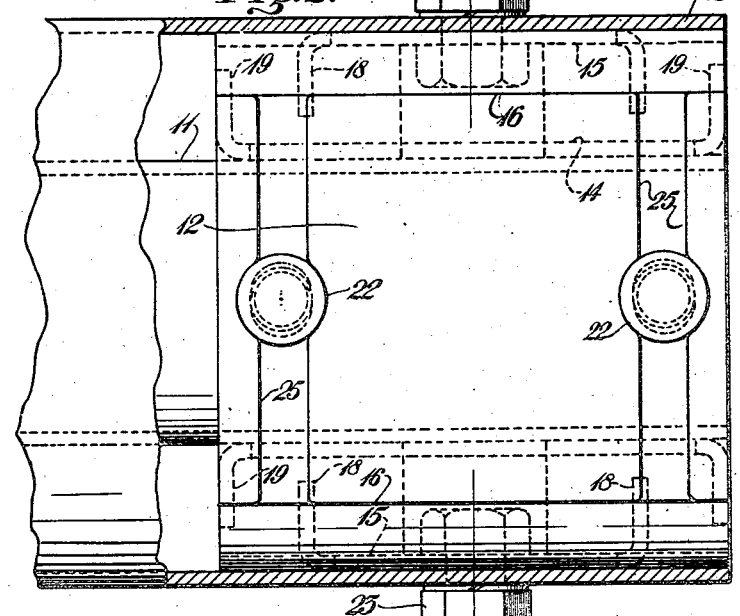
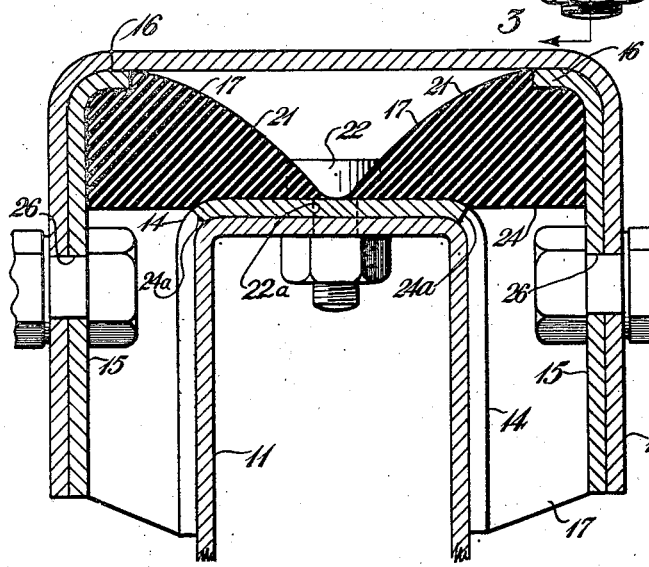
INVENTOR
Ellwood F. Riesing
BY
ATTORNEYS Sept. 2, 1941.      E. F. RIESING      2,254,783
INSULATOR
Filed Sept. 22, 1939      3 Sheets-Sheet 2

INVENTOR
Ellwood F. Riesing
BY
Ely & Frye
ATTORNEYS

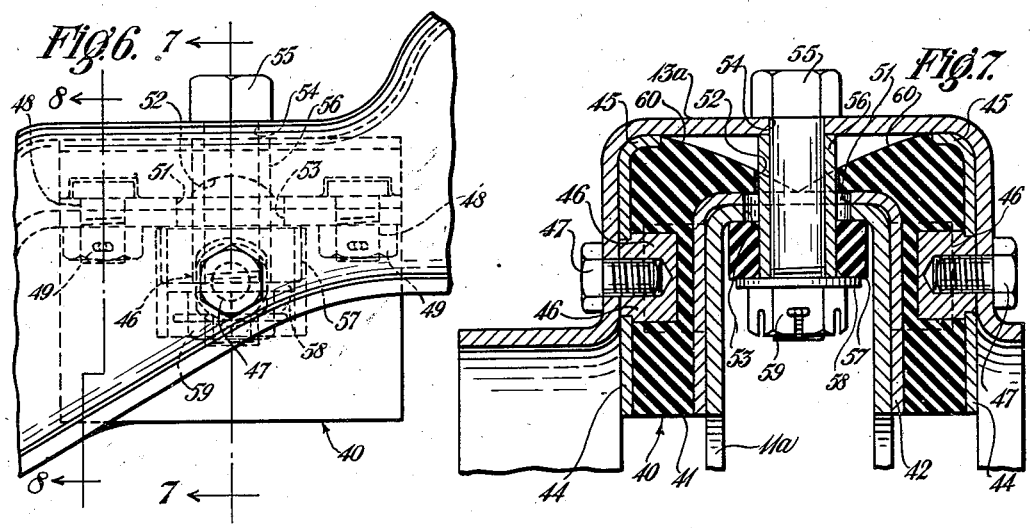
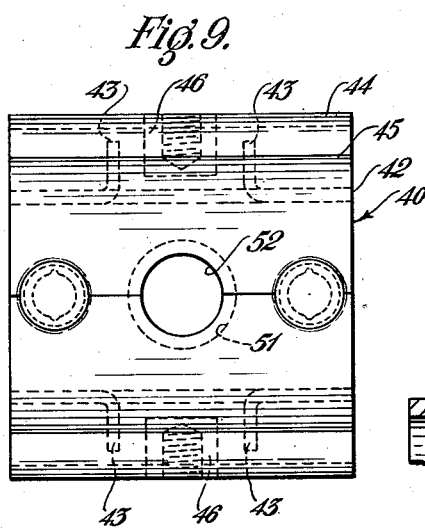
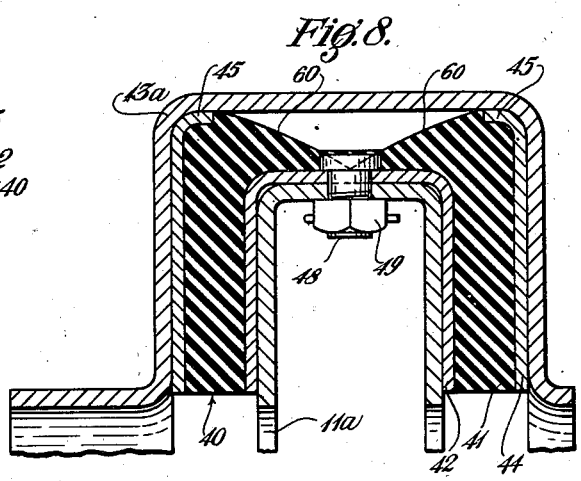

Patented Sept. 2, 1941

2,254,783

UNITED STATES PATENT OFFICE 2,254,783

INSULATOR

Ellwood F. Riesing, Akron, Ohio, assignor to The Firestone Tire & Rubber Company, Akron, Ohio, a corporation of Ohio Application September 22, 1939, Serial No. 296,081

14 Claims. (Cl. 248—358)

This invention relates to insulators of the type used for interposition between two relatively movable bodies to suppress the translation of vibration therebetween, and more especially it relates to vibration insulators for use between the axles and the body structure of a motor vehicle.

The chief objects of the invention are to provide an improved insulator of the character mentioned that employs rubber as a medium for insulating two relatively movable structures from each other; that is so constructed that relative lateral movement and relative fore and aft movement of the supporting and the supported members is opposed by the resistance to compression of the rubber; and is so constructed that vertical movement of one member toward the other places a portion of the rubber under tension and shear stress, and exerts compressive stress upon a progressively increasing area of another portion of the rubber to increase the deflection rate of the insulator. Other objects will be manifest as the description proceeds.

The invention will be described with particular reference to the accompanying drawings in which:

Figure 1 is an elevation of an insulator embodying the invention in operative association with dual cross members of a vehicle;

Figure 2 is a fragmentary plan, partly in section, of a portion of the apparatus shown in Figure 1;

Figure 3 is a vertical section on line 3—3 of Figure 2, under no load condition;

Figure 6 is an elevation, similar to Figure 1, of a modified embodiment of the invention;

Figure 7 is a section on the line 7—7 of Figure 6;

Figure 8 is a section on the line 8—8 of Figure 6; and

Figure 9 is a plan view of the insulator alone.

Figure 4:
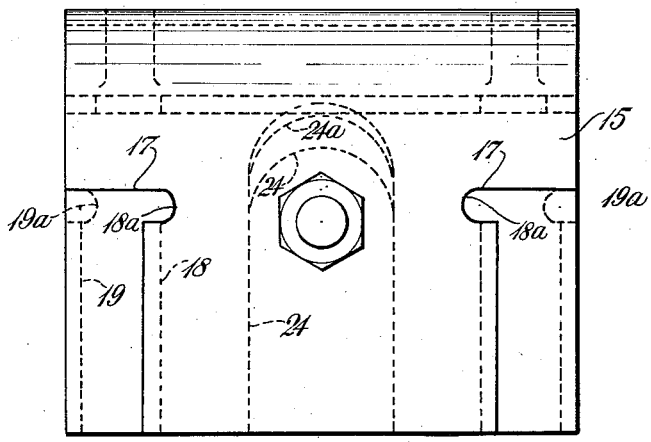
Figure 4 is a front elevation of the insulator of Figure 2 under load.

Referring particularly to Figure 1, a standard vehicle spring 10 is shown and it is secured to a substantially U-shaped, in section, sub-cross member 11. The sub-cross member 11 serves as a support for the body of the vehicle through two mountings or insulators, indicated generally by 12, which fit over the cross member at its ends and which in turn engage with and support a main cross member 13 that is associated with the vehicle body and that is movable relative to the sub-cross member 11. As is best shown in Figure 3, the portions of the members 11, 13 that engage with the insulator 10 are of channel shape, the channel of lower member 11 being narrower and shallower than the channel of member 13 and being disposed in spaced telescopic relation to the latter.

Figures 2 and 3 show the details of the insulator 12 which comprises a face plate, or inner member 14, substantially U-shaped in section, that is adapted to be secured to a support, such as the sub-cross member 11. Two face or side plates 15 having inwardly struck flanges 16 at their upper edges are provided for attaching the mounting to the main cross member 13. Separate rubber bodies 17, substantially inverted L-shape in section, are bonded, as by vulcanization, to opposite outer sides of the inner member 14 (extending the height thereof) and to the inner surface of the side plates 15 to form a unit therefrom. Thus the side plates 15 are resiliently connected to and separated from the inner member by leg portions of the rubber bodies 17. Pairs of inwardly directed side flanges 18 are formed on each of the outer members 15, while pairs of outwardly struck flanges 19 are formed on opposite sides of the member 14, as shown. Both pairs of flanges 18 and 19 extend up about half the height of the members 15 and 14, respectively, with arcuate recessed portions 18a and 19a being provided in the members at the upper ends of the flanges to reduce the stresses set up in the members by formation of the flanges. The flanges 18 are embedded in the rubber bodies while the flanges 19 form an end limit therefor. In all events, the space between the pair of adjacent flanges 18 and 19 is filled with rubber that is bonded to the metal flanges. Thus on longitudinal movement of either the inner or outer member relative to the other, a volume of rubber between one pair of adjacent flanges will be compressed and the rubber between the other pair of adjacent flanges will be placed under tension. These actions combine to resist extensive longitudinal movement of either the inner or outer member relative to each other. Of course, this maintains lateral stability and prevents excessive lateral movement of the vehicle body relative to the running gear. As the rubber extends around the ends of and between the flanges 18, this portion of the rubber also acts to resist relative movement of the inner and outer members.

Figure 5:
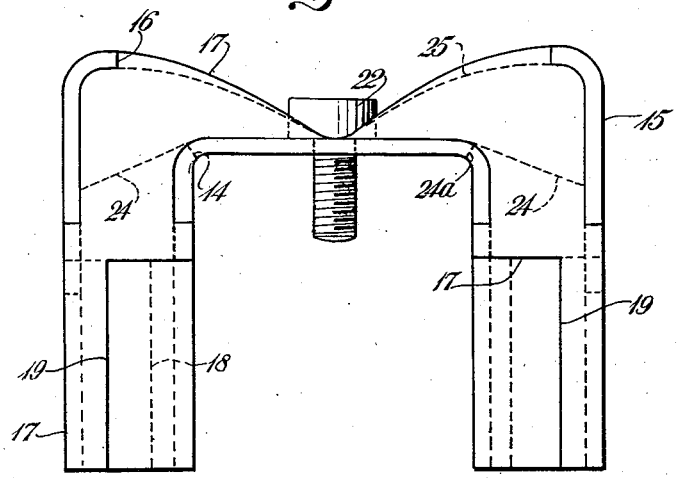
Figure 5 is a side elevation of the insulator of Figure 2 under load.

The main load carried by the mounting 12 usually is a compression load. To aid in supporting this load, the upper flanges 16 of the outer members 15 bear upon the upper surface of the rubber bodies 17, the rubber extending up flush with the edge of the flange. These rubber bodies have integral projections or arms 21 which are bonded to the upper surface of the inner member 14 and contact each other along the center line of same. In certain cases, it may be desirable to make the L shaped rubber bodies as an integral U shaped body. In all events, the load placed upon the main cross member 13 is transferred through the flanges 16 to the rubber body 17. Figures 3 and 5 show the relationship of the members and rubber support when unloaded and loaded, respectively, and it is seen that the rubber arms 21 are flattened and made of more uniform thickness when under load. This increase in thickness of a portion of the projection acts to place more rubber surface in contact with the supported member and is a feature of the invention. As this area of contact with the supported member increases, a portion of the arm will be directly compressed between the main cross member and the upper surface of the inner member although a large portion of the load is still carried to the inner member through shear and tensioning forces.

Bolts 22 extend through holes 22a formed in the upper portion of the inner member 14 to secure same to the sub-cross member 11 while bolts 23 engage with holes 26 in the outer members 15 to secure them to the main cross member 13. A substantially rectangular portion 24, having an arcuate top surface, of the rubber bodies 17 is cut out to provide a space between the inner and outer members for receiving the heads of the bolts 23. This cut out portion 24 extends substantially the height of the inner member 14 (Figure 3). Thus the bolts 23 can be inserted from the bottom of the mounting 12 after it is engaged with the sub-cross member. A recessed section 24a may also be provided in the inner member 14 to facilitate positioning and securing the bolts 23.

Figure 2 shows that grooves 25 are formed in the upper surface of the rubber body 17. These grooves extend from the edges of the flanges 16 of the outer members to the end of the arms 21 adjacent each end of the rubber body. The heads of the bolts 22 are received in these grooves to prevent the main cross member from ever bearing or bottoming on same.

Referring to the modified insulator 40 shown in Figures 6 through 9, it is generally similar to the insulator 10 and comprises an inverted U shaped rubber body 41, an inner member 42 having pairs of outwardly directed flanges 43 on each side thereof, and side or face plates 44 having inwardly turned flanges 45 at the upper edges thereof. For attaching the insulator to a channelled cross member 13a, each vertical leg portion of the insulator has a metal insert 46 molded into the rubber structure thereof, said insert being disposed between the flanges 45 of the adjacent portion of inner member 42. Each insert 46 extends through a suitable aperture in the face plate 44 and is flush with the outer face of the latter, the insert having a shoulder that abuts the inner face of the face plate to prevent it from being pulled through the said aperture. The inserts 46 are internally threaded from their outer ends to receive respective cap screws 47, the latter extending through suitable screw holes in the opposite sides of the channel cross member 13a, and thereby securing the latter to the insulator.

For securing the insulator to a second, and lower channelled cross member 11a, two headed studs 48, 48 extend through the horizontal portion of the inner member 42 adjacent the opposite ends thereof, said studs being swedged therein so as not to turn relatively thereof. The head of each stud 48 is disposed on the top side of the member 42, and is thinly overlaid by rubber of the structure 41. The studs 48 are insertable through respective apertures in the horizontal portion of lower cross member 11a, and are threaded to receive nuts 49, whereby said insulator is secured to said lower cross member.

This insulator 40, when assembled with the upper and lower cross members in the manner shown and described, is adapted yieldingly to oppose relative movement of said members in directions both longitudinally and transversely of the insulator, and movement of said members toward each other in a vertical direction, similarly to the insulator 10. In this embodiment of the invention, means also is provided for resisting movement of said cross members away from each other in a vertical direction, such as occurs during rebound, and to this end the inner member 42 of the insulator is apertured at 51, centrally of its horizontal portion, and the overlying rubber structure 41 is formed with an aperture 52 that is concentric with aperture 51, but is of somewhat smaller diameter. The lower cross member 11a is formed in its horizontal portion with an aperture 53 that is of the same size as aperture 51, the latter and the aperture 53 being registerable in the assembling of the insulator and face members. The upper cross member 13a is formed with an aperture 54 in its horizontal portion which aperture is smaller than apertures 51 and 53, and is axially aligned therewith in the assembly of the structure. A threaded bolt 55 extends through apertures 51, 52, 53 and 54, said bolt having a tubular sleeve 56 mounted thereon, the upper end of said sleeve abutting the under side of the horizontal portion of the member 13a, and the lower end of said sleeve being disposed below the horizontal portion of the member 11a. Mounted upon the lower end portion of sleeve 56 is an annular resilient rubber cushion 57, the top of which bears against the under side of the horizontal portion of cross member 11a, the bottom of said cushion being engaged by a washer 58 on the bolt 55, said washer being urged against the cushion 57 by a nut 59 on said bolt, the sleeve 56 limiting the movement of the washer toward said cushion. The arrangement is such that the cushion 57 yieldingly resists rebound of the cross member 13a relatively of the cross member 11a.

In the operation of the insulator, relative fore and aft movement of the cross members 11a, 13a is resisted by the leg portions of the rubber structure 41, one of which is thereby subjected to compressive stress and the other to tension. Relative lateral movement of the cross members, transversely of the vehicle, is resisted by the resistance of the rubber structure to compressive stresses set up when the inserts 46 move toward either of the tongues or flanges 43 between which they are positioned. Relative vertical movement of the cross members puts the leg portions of the rubber structure 41 under tension and shear stress, and puts the horizontal portion of the rubber structure, at the top thereof, under compressive stress, which stress progressively increases as the upper cross member 13a progressively increases its area of contact with the rubber by reason of the sloped, arcuate surfaces 60 at the top of the rubber structure. The rubber cushion 57 cushions the rebound that occurs during relative vertical movement of the upper and lower cross members. A feature of this form of the invention is that the bolt 55 forms a positive connection between the cross members 11a and 13a and thereby limits the vertical movement therebetween, even though complete failure of the rubber bond occurs.

Since the rubber insulators of the invention eliminate any mechanical connection between the vehicle body and the running gear, they reduce or eliminate passage of vibration therebetween. Also, they permit slight vertical movement of the body relative to the springs, while resisting lateral and longitudinal movement therebetween. These and other advantages result from the present constructions so that the objects of the invention are realized.

While a written description and illustration of two embodiments of the invention are disclosed herein, it will be understood that various modifications can be made without departing from the scope of the invention as defined in the appended claims.

What is claimed is:

1. In an insulator of the character described, the combination of resilient rubber means of general U shape, a metal facing bonded to the confronting faces of the vertical leg portions of the rubber means and to the contiguous bottom face of the intervening horizontal portion thereof, and metal facings bonded to the respective outwardly directed faces of said leg portions, the upper margins of the latter facings being turned toward each other, upon the top face of the horizontal portion of the rubber means, for a distance equal to about half the thickness of a vertical leg of the rubber structure.

2. In an insulator of the character described, the combination of resilient rubber means of general U shape, a metal facing bonded to the confronting faces of the leg portions of the rubber means and to the contiguous bottom face of the intervening horizontal portion thereof, metal facings bonded to the respective outwardly directed faces of said leg portions, and means secured to said metal facings and extending laterally into the leg portions of the rubber means, in spaced intercalated relation, for effecting compressive stress of portions of the rubber means when said facings move relatively of each other.

3. An insulator of the character described, comprising a resilient rubber structure of general U shape, a metal facing bonded to the confronting faces of the leg portions of the rubber structure and to the contiguous bottom face of the intervening horizontal portion thereof, metal facings bonded to the respective outwardly directed faces of said leg portions, integral tongues struck from the respective legs of the first mentioned facing and projecting laterally into the rubber structure in parallel spaced relation to each other, and metal inserts in the rubber structure between each pair of tongues and secured to the respective facings on the outwardly directed faces of the leg portions of the rubber structure.

4. An insulator of the character described, adapted to be positioned between two telescopically disposed channels, said insulator comprising a resilient rubber structure of general U shape, a metal facing bonded to the confronting faces of the leg portions and the bottom face of the horizontal portion of the rubber structure adapted to engage the outside of the inner channel, respective metal facings on the outer faces of the leg portions of the rubber structure engaging the inner lateral faces of the outer channel, and means connecting said facings to the inner and outer channels, the top face of the rubber structure being exposed to the upper channel, and so shaped as progressively to be brought into contact therewith upon relative movement of the channels toward each other.

5. An insulator as in claim 4 in which a member for limiting the movement out of telescoped relation of the channels extends between the telescopically disposed channels.

6. A vibration insulator adapted to be positioned between two relatively movable, telescopically disposed channels, said insulator comprising a resilient rubber structure of general U shape, a metal facing bonded to the confronting faces of the leg portions of the rubber structure and the contiguous face of the intervening portion of the structure adapted to engage the outside of the inner channel, respective metal facings bonded to the outer lateral faces of the rubber structure adapted to engage the inner lateral faces of the outer channel, and means connecting said facings to the inner and outer channels, the top face of the rubber structure confronting the adjacent face of the upper channel and being formed with surfaces disposed at an angle to the channel whereby the rubber structure and channel are brought progressively into contact upon movement of the channels toward each other.

7. A vibration insulator as defined in claim 6 wherein the top face of the rubber structure remote from the middle thereof is locally in contact with the bottom face of the outer channel under all conditions of service.

8. A combination as defined in claim 6 wherein the metal facings on the outer lateral faces of the rubber structure have their upper marginal portions extended laterally onto the top of the rubber structure a distance equal to about half the thickness of a leg portion of the said structure.

9. A vibration insulator adapted to be positioned between two relatively movable, telescopically disposed channels, said insulator comprising a resilient rubber structure of general inverted channel shape, a metal facing bonded to the inner faces of the rubber structure, metal facings bonded to the respective outer lateral faces of the rubber structure, parallel, spaced-apart, vertically disposed tongues struck out from the inner metal facing and extending laterally into the leg portions of the rubber structure, respective metal inserts embedded in the rubber structure between each pair of tongues, said inserts being secured to the respective outer metal facings, means threaded into said inserts for securing the insulator to the outermost of the relatively movable channels, and means for connecting the innermost metal facing to the inner channel.

10. An insulator comprising an inner member, two side plates, and rubber bodies bonding said side plates to opposite sides of said inner member, said inner member having outwardly struck flanges intermediate the ends thereof adjacent its base, and said side plates having inwardly struck flanges at the edges thereof adjacent their bases, said rubber bodies extending between and bonded to said flanges whereby relative movement between said inner member and said side members is resisted due to compression and tension set up in rubber between adjacent overlapping flanges.

11. An insulator comprising an inner member adapted to be secured to a support, two rubber bodies bonded to opposed outer sides of said inner member and extending onto the top of said inner member in sufficient mass to provide a cushion thereon, and side plates bonded to the respective rubber bodies and having flanged upper portions that extend over a minor portion of the rubber bodies and are bonded thereto, said side plates being adapted to be secured to a supported member that rests upon said flanges, and be moved downwardly relative to said inner member when under load.

12. An insulator comprising an inner member substantially channel shaped in section, rubber bodies bonded to opposite sides of said inner member and being provided with arms extending over a substantial portion of the central portion of the inner member, side plates bonded to said rubber bodies and extending over a minor portion of the central portion thereof and being bonded thereto whereby load can be applied to said side plates and transferred through said rubber to said inner member, said inner member being provided with outwardly directed flanges that are embedded in said rubber bodies and said side plates being provided with inwardly directed flanges at the ends thereof that abut the ends of said rubber bodies whereby relative axial movement of said inner member and side plates is resisted.

13. In an insulator of the character described, the combination of resilient rubber means of general inverted U-shape, a metal facing bonded to the confronting faces of the leg portions of the rubber means and to the contiguous bottom face of the intervening horizontal portion thereof, and metal facings bonded to the respective outwardly directed faces of said leg portions, the rubber extending to the upper extremities of said metal facings so as to be in contact with any flat member spanning the same, the top of the rubber structure between said facings diminishing in thickness toward the middle thereof so as progressively to effect operative engagement with such spanning member when the rubber structure is subject to load in a vertical direction.

14. An insulator unit comprising inner and outer members substantially channel shaped in section and arranged in nested relation, rubber bodies operably attached to the sides of said inner member and extending at least partially over the central portion of said inner member, the outer sides of said rubber bodies being operably attached to the sides of said outer member, the faces of the rubber bodies confronting the central portion of said outer member being so shaped as to progressively come into operative supporting relation between the central portions of said inner and outer channel members to supplement the shearing resistance of the rubber between the side members of the channel.

ELLWOOD F. RIESING.